(12) United States Patent
Chen et al.

(10) Patent No.: US 7,501,805 B2
(45) Date of Patent: Mar. 10, 2009

(54) CIRCUIT AND METHOD FOR SOFT START FROM A RESIDUAL VOLTAGE

(75) Inventors: Isaac Y. Chen, Jubei (TW); An-Tung Chen, Pingjen (TW); Liang-Pin Tai, Tainan (TW)

(73) Assignee: Richtek Technology Corp., Hsinchu (TW)

( * ) Notice: Subject to any disclaimer, the term of this patent is extended or adjusted under 35 U.S.C. 154(b) by 201 days.

(21) Appl. No.: 11/487,388

(22) Filed: Jul. 17, 2006

(65) Prior Publication Data
US 2007/0064454 A1 Mar. 22, 2007

(30) Foreign Application Priority Data
Sep. 21, 2005 (TW) .............................. 94129800 A

(51) Int. Cl.
*H02M 3/158* (2006.01)
(52) U.S. Cl. ..................... 323/282; 323/901; 363/49

(58) Field of Classification Search ................. 323/271, 323/282, 901; 363/49
See application file for complete search history.

(56) References Cited

U.S. PATENT DOCUMENTS

| 4,806,842 | A | * | 2/1989 | Bittner | 323/222 |
| 5,917,313 | A | * | 6/1999 | Callahan, Jr. | 323/288 |
| 6,316,926 | B1 | * | 11/2001 | Savo et al. | 323/282 |
| 7,208,927 | B1 | * | 4/2007 | Nguyen | 323/282 |
| 2004/0022078 | A1 | * | 2/2004 | Shieh | 363/49 |

* cited by examiner

*Primary Examiner*—Jeffrey L Sterrett
(74) *Attorney, Agent, or Firm*—Rosenberg, Klein & Lee

(57) ABSTRACT

A circuit and method for soft start of a system compare a feedback signal produced from an output voltage of the system with a ramp signal to generate a comparison signal, and enables the system once the comparison signal indicating the ramp signal reaches the feedback signal, such that the output voltage becomes active from a residual voltage toward a target level.

13 Claims, 6 Drawing Sheets

US 7,501,805 B2

CIRCUIT AND METHOD FOR SOFT START FROM A RESIDUAL VOLTAGE

FIELD OF THE INVENTION

The present invention is related generally to a soft start circuit and method and, more particularly, to a circuit and method for soft start from a residual voltage.

BACKGROUND OF THE INVENTION

Many systems employ soft start function for the systems to smoothly start up when system power on to reduce the impact during the start up and to prevent overloading to some components and overvoltage in the systems. FIG. 1 is a simplified diagram of a conventional pulse width modulation (PWM) buck converter 100 with soft start function, in which two switches SW1 and SW2 connected in series between supply voltage Vcc and ground GND are switched by signals CTL and SYN, respectively, to convert the input voltage Vcc to an output voltage Vo for loads Load1 and Load2, sample, and hold unit 102 produces feedback signal VFB from the output voltage Vo, error amplifier 106 has an inverting input connected with the feedback signal VFB and a non-inverting input connected with a reference signal Vr or a ramp signal SS_Ramp from multiplexer 104, multiplexer 108 selects between the output of the error amplifier 106 and ramp signal SS_Ramp, comparator 112 has an inverting input connected with a ramp 110 and a non-inverting input connected with the output of the multiplexer 108, to produce the signals CTL and SYN, and enable signal EN enables the error amplifier 106 and the comparator 112 for the converter 100 to operate.

FIG. 2 is a waveform diagram of various signals in the converter 100 of FIG. 1 during a soft start period, in which waveforms 114 and 116 represent the output voltage Vo, waveform 118 represents the ramp signal SS_Ramp, waveforms 120 and 121 represent the feedback signal VFB, and waveform 122 represents the enable signal EN. Referring to FIGS. 1 and 2, when the enable signal EN transits from low level to high level as shown by the waveform 122, the error amplifier 106 and the comparator 112 are enabled, and thus the non-inverting input of the error amplifier 106 receives the ramp signal SS_Ramp from the multiplexer 104. Generally speaking, when the converter 100 begins to start up, the output voltage Vo will be zero as shown by the waveform 116, and during the soft start period, the output voltage Vo begins to rise up toward a target level. However, due to the residual charges on the output Vo of the converter 100 resulted from the previous operation, the output voltage Vo may have a nonzero initial level as shown by the waveform 114, and thus the feedback signal VFB will be greater than the ramp signal SS_Ramp as shown by the waveforms 121 and 118. In this case, the converter 100 will first release the residual charges on the output Vo to pull down the output voltage Vo until the feedback signal VFB becomes lower than the ramp signal SS_Ramp, and therefore the residual charges on the output Vo are wasted.

U.S. Pat. No. 6,841,977 to Huang et al. discloses a soft start circuit that maintains the low-side switch at off state until the output voltage reaches a target level so as to remain the residual voltage on the output. However, such circuit can be only applied to buck PWM converter. Solie proposes a soft start circuit in U.S. Pub. No. 2004/0228152, which first charges a soft start capacitor by the residual charges on the converter output before enabling the converter such that on the soft start capacitor and the converter output will have a same voltage, and then uses the voltage on the capacitor as a reference voltage to be compared with the voltage on the converter output when enabling the converter. By this way, it will not require to release to the residual voltage on the converter output. However, this art needs an extra capacitor, and the ramp signal for the output voltage to first compare is an RC discharge curve, which is disadvantageous to the soft start performance.

Therefore, it is desired a soft start circuit and method without requiring to release the residual voltage, without requiring extra component, and with wider application range.

SUMMARY OF THE INVENTION

An object of the present invention is to provide a circuit and method for a system to soft start from a residual voltage, thereby saving power and requiring no extra component.

In a method for soft start from a residual voltage, according to the present invention, an output voltage of a system is monitored to produce a feedback signal, the feedback signal is compared with a ramp signal, and one the ramp signal reaches the feedback signal, the system is enabled such that the output voltage becomes active from the residual voltage toward a target level.

In a circuit for soft start from a residual voltage, according to the present invention, a comparator compares a feedback signal produced from an output voltage of a system with a ramp signal to generate a comparison signal, and a controller in response to the comparison signal to enable the system upon the ramp signal reaching the feedback signal, such that the output voltage becomes active from the residual voltage toward a target level.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAIL DESCRIPTION OF THE INVENTION

Figure 1:
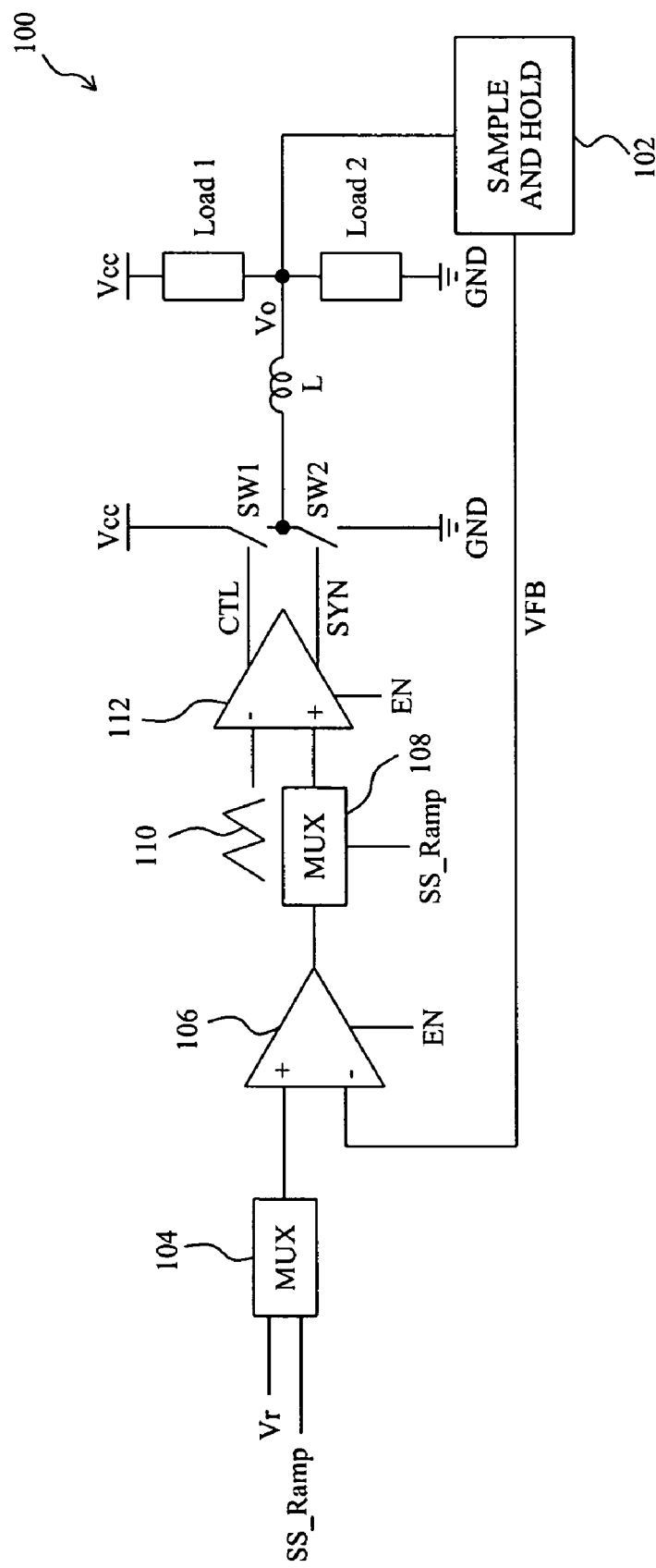
FIG. 1 is a simplified diagram of a conventional PWM buck converter with soft start function.
Figure 2:
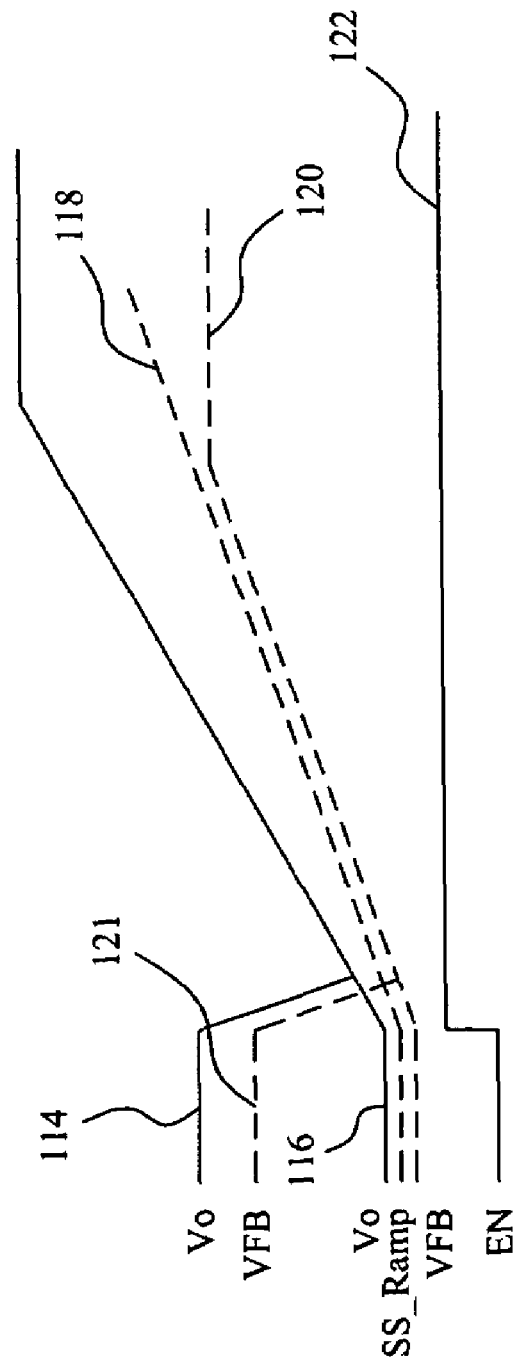
FIG. 2 is a waveform diagram of various signals in the converter of FIG. 1 during a soft start period.
Figure 3:
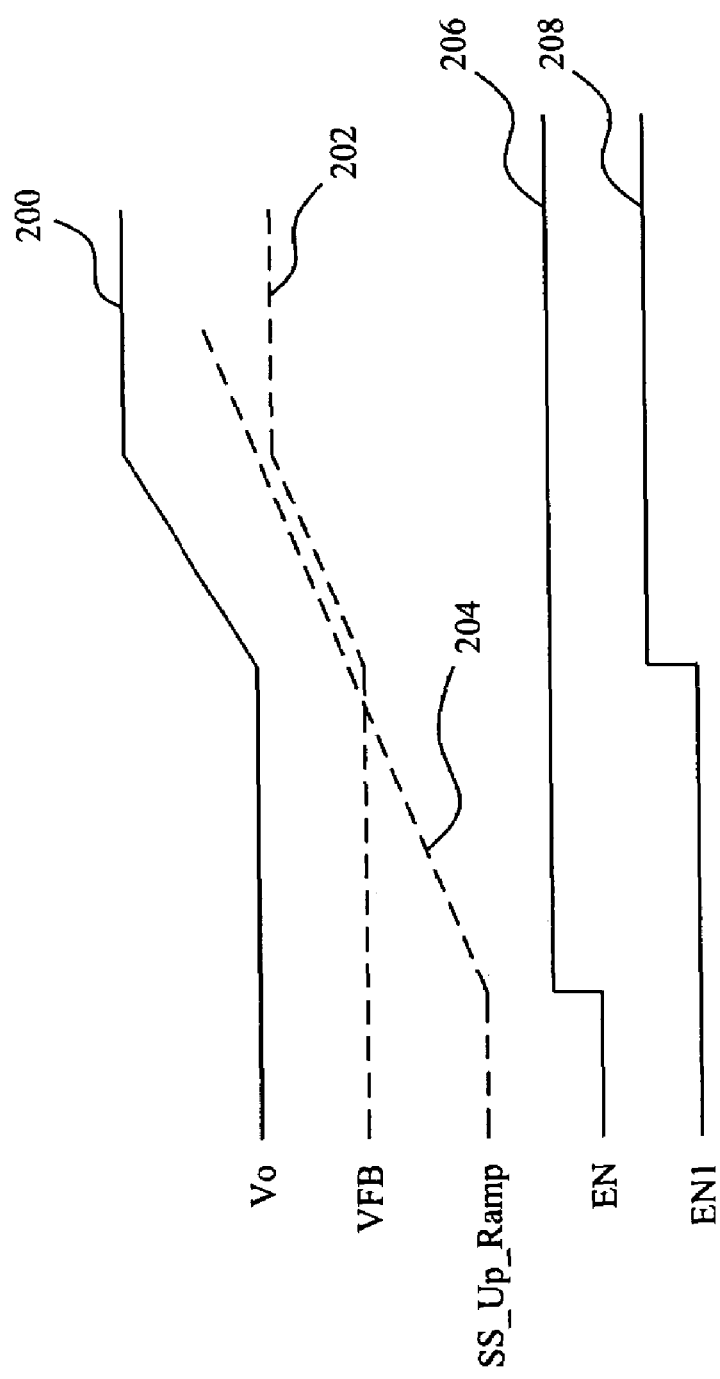
FIG. 3 is a waveform diagram of various signals when a method according to the present invention is applied to a system whose output has a residual voltage during a soft start period.

To illustrate a soft start method according to the present invention, FIG. 3 provides a waveform diagram of various signals when an output has a residual voltage during a soft start period, in which waveform 200 represents the voltage Vo on the output, waveform 202 represents a feedback signal VFB proportional to the voltage Vo, waveform 204 represents a ramp signal SS_Up_Ramp to compare with the feedback signal VFB, waveform 206 represents an original enable signal EN, and waveform 208 represents an applied enable signal EN1 for the system really to start up. As shown by the waveform 206, upon the original enable signal EN transiting to high level, a soft start begins, and the ramp signal SS_Up_Ramp begins to rise up. By the method according to the present invention, the ramp signal SS_Up_Ramp is compared with the feedback signal VFB. If the output has a residual voltage such that the initial level of the feedback signal VFB is higher than the ramp signal SS_Up_Ramp, as shown by the waveforms 202 and 204, the system will not start up, and the output will remain the residual voltage. Until the ramp signal SS_Up_Ramp reaches the feedback voltage VFB, the enable signal EN1 transits to high level as shown by the waveform 208, which in turn enables the system, and the voltage Vo on the output begins to rise up from the residual voltage toward a target level.

Figure 4:
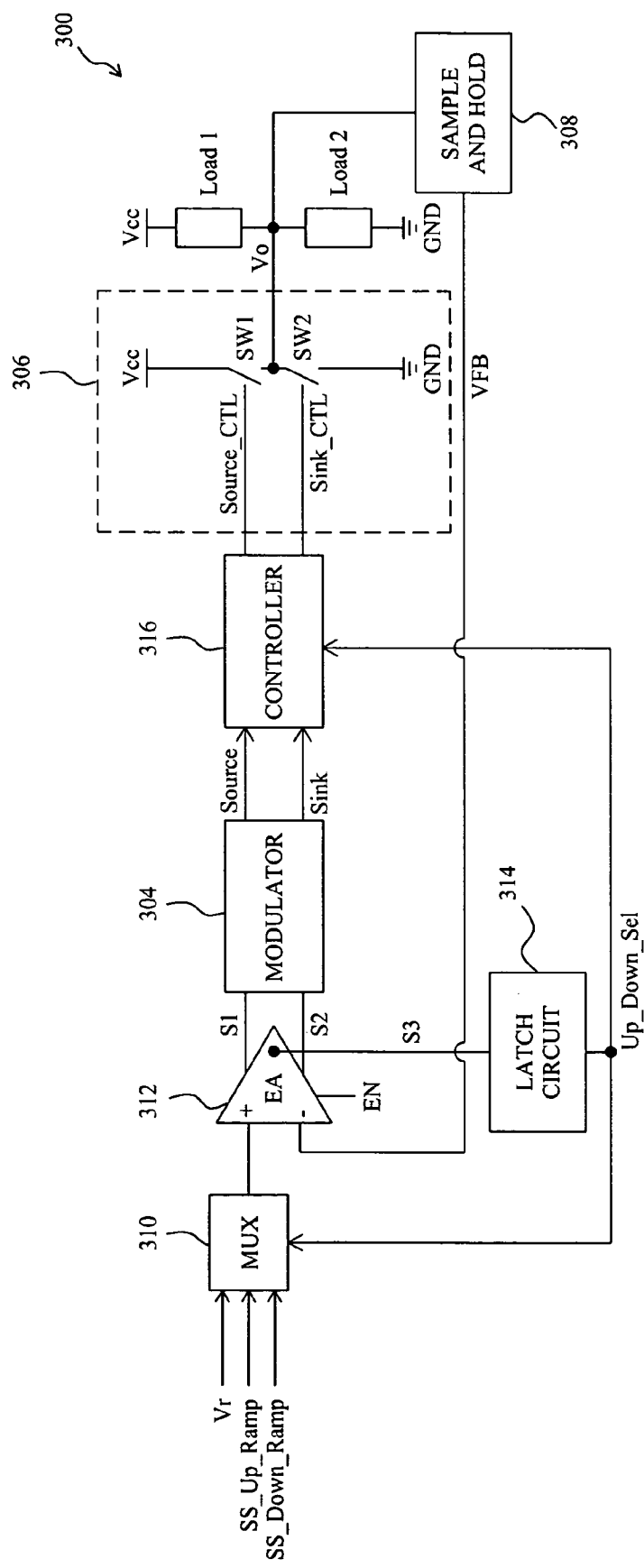
FIG. 4 is a simplified diagram of a DC-to-DC converter with a circuit according to the present invention.

FIG. 4 is a simplified diagram of a DC to DC converter 300, in switching circuit 306 includes a pair of switches SW1 and SW2 connected in series between supply voltage Vcc and ground GND, signals Source_CTL and Sink_CTL switch the switches SW1 and SW2 so as to produce an output voltage Vo, sample and hold unit 308 produces a feedback signal VFB from the output voltage Vo, multiplexer 310 in response to a signal Up_Down_Sel switches a reference signal Vr, a rising up ramp signal SS_Up_Ramp, or a falling down ramp signal SS_Down_Ramp to a non-inverting input of error amplifier 312 to compare with the feedback signal VFB at an inverting input of the error amplifier 312 to generate signals S1 and S2 for modulator 304 and signal S3 for latch circuit 314, the modulator 304 is enabled when the feedback signal VFB is higher than the rising up ramp signal SS_Up_Ramp or lower than the falling down ramp signal SS_Down_Ramp to generate signals Source and Sink for controller 316, the latch circuit 314 in response to the signal S3 determines the select signal Up_Down_Sel, and the controller 316 produces the signals Source_CTL and Sink_CTL based on the signals Up_Down_Sel, Source and Sink. In other embodiments, the error amplifier 312 may be replaced with comparator or other the like.

Figure 5:
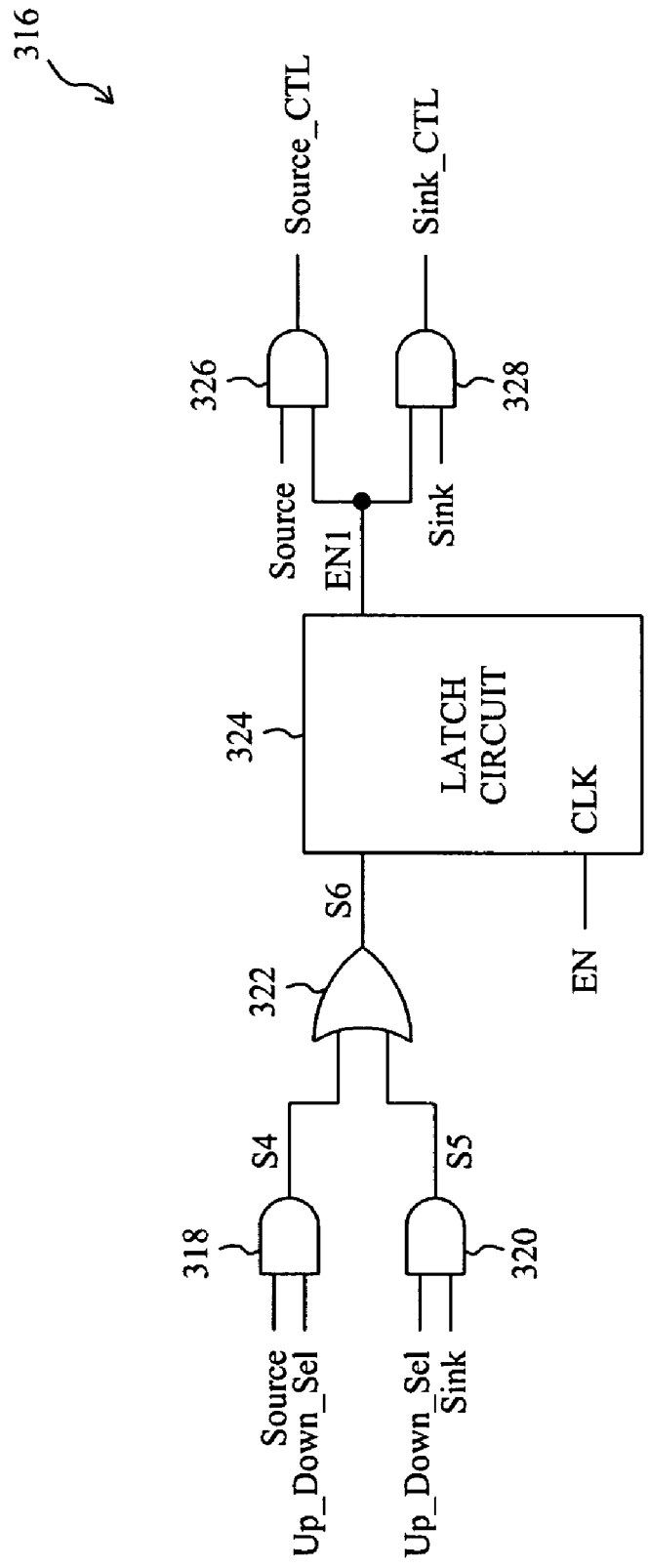
FIG. 5 shows an embodiment for the controller shown in FIG. 4.

FIG. 5 provides an embodiment for the controller 316 shown in FIG. 4, which comprises AND gate 318 in response to the signals Source and Up_Down_Sel to produce a signal S4, AND gate 320 in response to the signals Sink and Up_Down_Sel to produce a signal S5, OR gate 322 in response to the signals S4 and S5 to produce a signal S6 for latch circuit 324, the latch circuit 324 in response to the signal S6 and the original enable signal EN to determine the signal EN1, AND gate 326 in response to the signals Source and EN1 to determine the signal Source_CTL, and AND gate 328 in response to the signals Sink and EN1 to determine the signal Sink_CTL.

Figure 6:
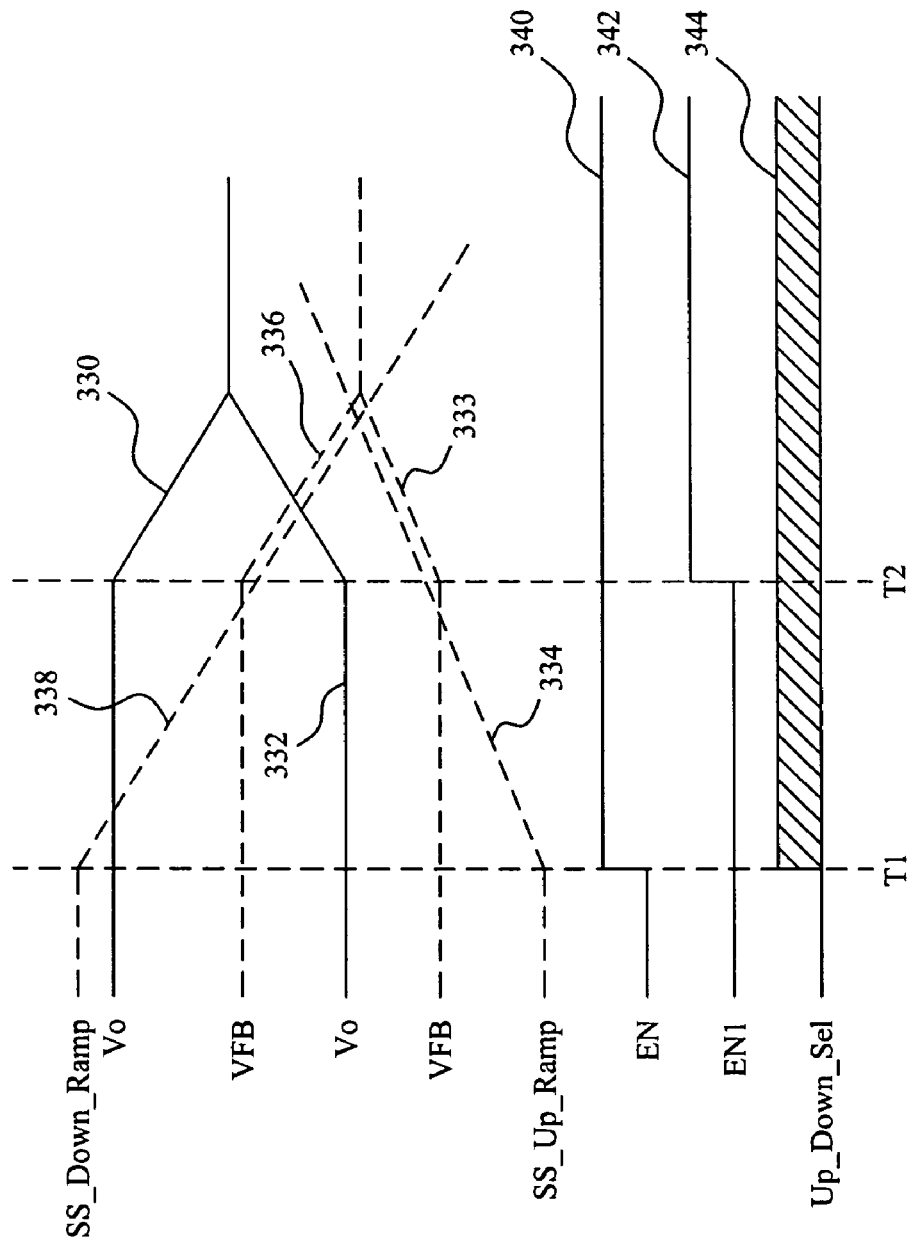
FIG. 6 is a waveform diagram of various signals in the converter of FIG. 4 during a soft start period.

FIG. 6 is a waveform diagram of various signals in the converter 300 of FIG. 4 when the output Vo has a residual voltage during a soft start period, in which waveforms 330 and 332 represent the voltage on the output Vo, waveform 334 represents the rising up ramp signal SS_Up_Ramp, waveforms 333 and 336 represent the feedback signal VFB, waveform 338 represents the falling down ramp signal SS_Down_Ramp, waveform 340 represents the original enable signal EN, waveform 342 represents the enable signal EN1 produced according to the present invention, and waveform 344 represents the select signal Up_Down_Sel. Referring to FIGS. 4-6, when the original enable signal EN transits from low level to high level at time T1 as shown by the waveform 340, the converter 300 begins a soft start, and the error amplifier 312 is enabled to compare the feedback signal VFB with the reference signal Vr to determine the signal S3 for the latch circuit 314. In response to the signal S3, the latch circuit 314 determines the select signal Up_Down_Sel for the multiplexer 310 in the manner that, if the feedback signal VFB is lower than the reference signal Vr, the multiplexer 310 will switch the rising up ramp signal SS_Up_Ramp to the non-inverting input of the error amplifier 312; otherwise, the multiplexer 310 will switch the falling down ramp signal SS_Down_Ramp to the non-inverting input of the error amplifier 312. Thereafter, the error amplifier 312 compares the feedback signal VFB with the rising up ramp signal SS_Up_Ramp or the falling down ramp signal SS_Down_Ramp to determine the signal S3 for the latch circuit 314 such that the select signal Up_Down_Sel is determined for the controller 316. During the period from time T1 to time T2, the rising up ramp signal SS_Up_Ramp or the falling down ramp signal SS_Down_Ramp has not yet reached the feedback signal VFB, and thus the select signal Up_Down_Sel is low, resulting in the enable signal EN1 at low level as shown by the waveform 342. Accordingly, the signals Source_CTL and Sink_CTL both are at low level, and the switches SW1 and SW2 turn off. As a result, the voltage on the output Vo remains the residual voltage approximately, as shown by the waveforms 330 and 332. Once the rising up ramp signal SS_Up_Ramp or the falling down ramp signal SS_Down_Ramp reaches the feedback signal VFB, the enable signal EN1 transits to high level, and the controller 316 begins to switch the switches SW1 and SW2 by the signals Source_CTL and Sink_CTL. Then the voltage on the output Vo becomes active to rise up or fall down toward the target level from the residual voltage.

According to the present invention, when soft starting up the converter 300, if a residual voltage is detected on the output Vo, the converter 300 will soft start from the residual voltage, but not release the residual voltage, and thus the power consumption is reduced and the output Vo is prevented from sinking or sourcing large current during the soft start period. Furthermore, it is more practice and easier to implement since there is required no extra component, such as capacitor and comparator.

Applied to various converters, such as synchronous PWM buck converter, asynchronous PWM buck converter, synchronous PWM boost converter, asynchronous PWM boost converter, synchronous PWM boost-buck converter, asynchronous PWM boost-buck converter, low dropout regulator (LDO), flyback converter, forward converter, Cuk converter, and single end primary inductor circuit (SEPIC), and other systems such as amplifier, the circuit and method according to the prevent invention can soft start the system with its output active from the residual voltage toward the target level, by which energy will not be wasted and no reverse current short circuit effect will not be induced.

While the invention has been described by way of example and in terms of the preferred embodiment, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation to encompass all such modifications and similar arrangements.

What is claimed is:

1. A circuit for soft start from a residual voltage, comprising:
   a comparator for comparing a feedback signal produced from an output voltage of a system with a ramp signal to generate a comparison signal;
   a controller being responsive to the comparison signal, for enabling the system such that when the ramp signal reaches the feedback signal the output voltage adjusts from the residual voltage to a target level according to the ramp signal; and a multiplexer for switching the ramp signal for the comparator in response to a comparison of the feedback signal with a reference signal.

2. The circuit of claim 1, further comprising a sample and hold unit for producing the feedback signal from the output voltage.

3. The circuit of claim 1, wherein the ramp signal is a rising up signal.

4. The circuit of claim 1, wherein the ramp signal is a falling down signal.

5. A method for soft start from a residual voltage, comprising the steps of:
- producing a feedback signal from an output voltage of a system;
- comparing the feedback signal with a reference signal for selecting a ramp signal; and
- comparing the feedback signal with the ramp signal for enabling the system upon the ramp signal reaching the feedback signal, such that the output voltage becomes active to adjust according to the ramp signal directly from the residual voltage to a target level.

6. The method of claim 5, wherein the ramp signal is a falling down signal.

7. The method of claim 5, wherein the ramp signal is a rising up signal.

8. The method of claim 5, wherein the step of producing a feedback signal from an output voltage of a system comprises the step of sampling the output voltage.

9. A DC to DC converter with soft start from a residual voltage, comprising:
- a power stage for converting an input voltage to an output voltage;
- a comparator for comparing a feedback signal produced from the output voltage with a ramp signal to generate a first comparison signal and a second comparison signal;
- a modulator for generating a modulation signal in response to the first comparison signal; and
- a controller receiving the modulation signal and the second comparison signal, for driving the power stage with the modulation signal once the ramp signal reaches the feedback signal, such that the output voltage becomes active from the residual voltage toward a target level.

10. The converter of claim 9, further comprising a sample and hold unit for producing the feedback signal from the output voltage.

11. The converter of claim 9, wherein the ramp signal is a falling down signal.

12. The converter of claim 9, further comprising a multiplexer in response to a comparison of the feedback signal with a reference signal, for switching the ramp signal for the comparator.

13. The converter of claim 9, wherein the ramp signal is a rising up signal.

* * * * *